Feb. 20, 1968   E. T. SHERWOOD ET AL   3,369,488
ELECTRONICALLY ENERGIZED DEVICE
Filed May 31, 1946   3 Sheets-Sheet 1
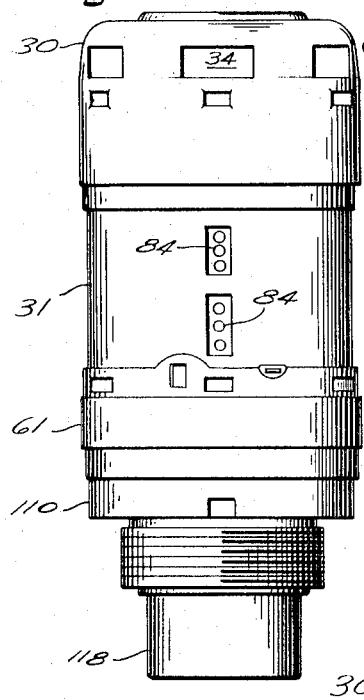
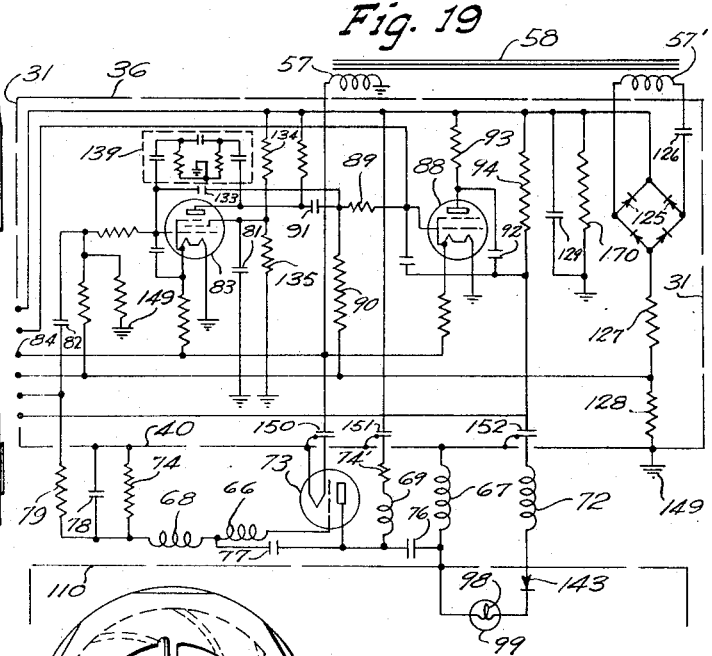
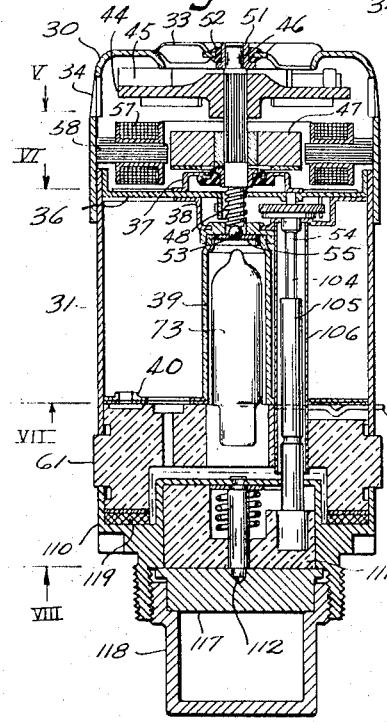
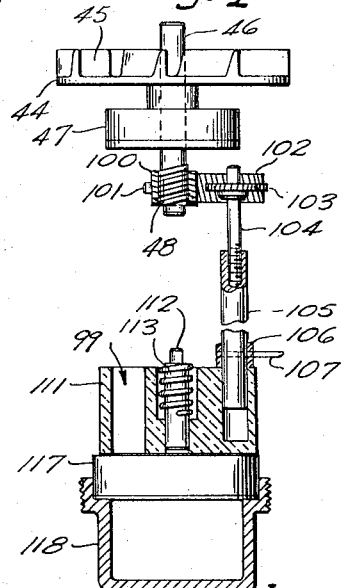
Inventors
Edwin T. Sherwood, Herbert L. White,
Harry W. Rubinstein, & George M. Ehlers
By John W. Michael
Attorney Inventors
Edwin T. Sherwood, Herbert L. White
Harry W. Rubinstein, & George M. Ehlers
By John W. Michael
Attorney

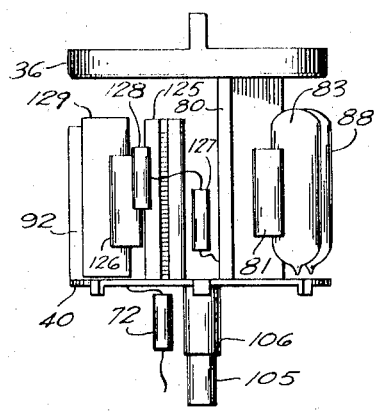
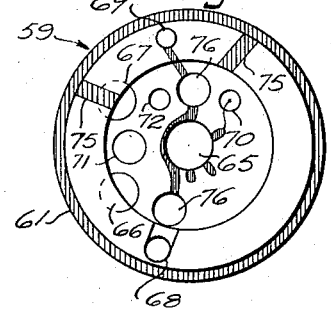
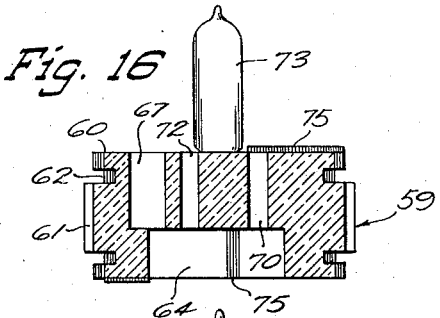
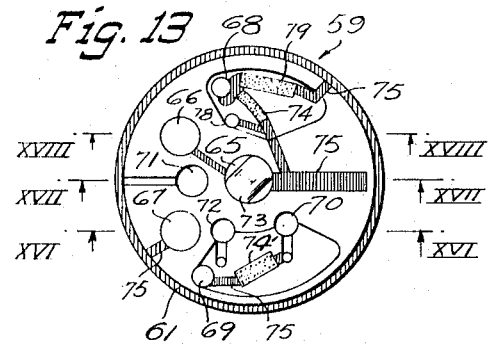
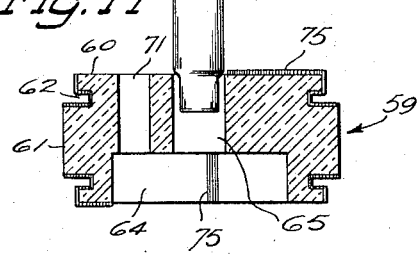
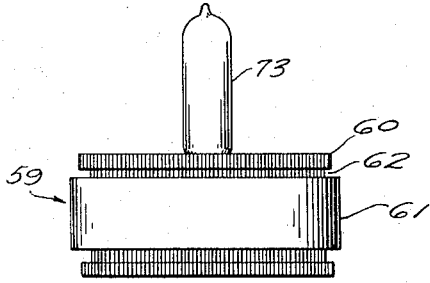
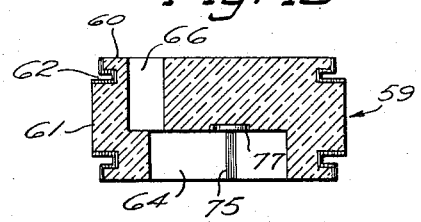

United States Patent Office 3,369,488
Patented Feb. 20, 1968

3,369,488
ELECTRONICALLY ENERGIZED DEVICE
Edwin T. Sherwood, Herbert L. White, Harry W. Rubinstein, and George M. Ehlers, Milwaukee, Wis., assignors to Globe-Union, Inc., Milwaukee, Wis., a corporation of Wisconsin
Filed May 31, 1946, Ser. No. 673,460
2 Claims. (Cl. 102—70.2)

This invention relates to improvements in devices utilizing the interference between a transmitted signal and its reflection for initiating a train of actions, and more particularly to a fuse for exploding a projectile and in which flight of the projectile causes energization of an electronic device transmitting a continuous radio frequency signal and receiving reflection of the signal, a resultant of the frequencies of the two signals being amplified by the electronic device to detonate the projectile.

In projectiles fired at moving targets, the aiming of a gun requires that a large number of changing factors be constantly and instantly employed to modify each other in attaining even approximately accurate gun pointing. When the target is moving at a high rate of speed, and especially if the course thereof may be controlled or changed quickly and at will, as is the case particularly with aircraft, the difficulty of hitting the target is largely increased. If a projectile is provided with a fuse activated only upon coming into proximity to the target, the effectiveness of anti-aircraft fire, for example, is largely increased. Such target activation or proximity actuation of a fuse may be obtained by an electronic device in the fuse and continuously sending a constant radio-frequency signal which is reflected by the target, as is well known. The reflected signal may be received by another electronic device in the fuse or by the transmitting electronic device in the fuse and may be caused to interact with the transmitted signal to produce an interference or resultant signal which may be amplified sufficiently to detonate the projectile. It has been found that such proximity fuse can be made to operate at any desired distance from the target at which the explosion of the projectile will be effective in disabling the target, or, when used with a relatively stationary target, may be made effective at the distance at which the explosion of the projectile will have its maximum effect on the stationary target.

For use as a fuse, the entire device must be of such size as to fit into and become a portion of projectiles now in use, with the minimum change in the ballistic characteristics of such projectiles. The device must function at the resultant frequency regardless of the angle or velocity of approach of the projectile to the target. The fuse must be sufficiently rugged to withstand the accelerations from rest to gun muzzle velocity occurring in firing the projectile and the centrifugal force due to spinning of the projectile in its flight. The fuse should be self-powered responsive to any flight conditions to which it is subjected. The fuse must be wholly inoperable during handling or storage and should be operable only after firing and after predetermined flight of the projectile. And it is desirable that such fuse be certainly self-destructive even if the projectile misses the desired target.

It is therefore one object of the present invention to provide an electronic device which will transmit a radio frequency signal and will receive the reflection thereof to produce an interference or resultant signal which may be amplified to any extent desired to initiate a train of actions.

Another object of the invention is to provide an electronic device to which power is supplied only as a result of movement of the device and which cannot be accidently energized prior to such movement for a predetermined distance.

Another object of the invention is to provide an explosive projectile in which a plurality of electronic devices are included by which a signal is transmitted and the interference between such signal and its reflection is employed to detonate the projectile and is effective regardless of the flight conditions of the projectile.

Another object of the invention is to provide a fuse for projectiles of various sizes now in use and in which the fuse is provided with electronic devices of such size and ruggedness as to be inclusive in the projectile and capable of exploding the projectile upon reaching a predetermined proximity to the target at which the projectile is aimed.

And a further object of the invention is to provide a fuse for exploding projectiles in which the fuse has the minimum effect on the ballistics of the projectile, is totally inert until activated by flight of the projectile for a predetermined distance and is self-destructive if the projectile misses the target.

Objects and advantages other than those above set forth will be apparent from the following description when read in connection with the accompanying drawing, in which:

FIG. 1 is a side elevation of a completed fuse embodying the present invention;

FIG. 2 is a front or "nose" elevation of a completed fuse;

FIG. 3 is a cross section of the fuse taken on a plane substantially through the longitudinal axis thereof;

FIG. 4 is a somewhat diagrammatic view partially in elevation and partially in section of one sub-assembly included in a completed fuse;

FIG. 12 is a side elevation similar to FIG. 11 but rotated 90° relative thereto and 180° relative to FIG. 9;

FIG. 13 is a top plan view of a sub-assembly for producing and receiving a radio frequency signal;

FIG. 14 is a side elevation of the structure shown in FIG. 13;

FIG. 15 is a bottom view of the structure shown in FIG. 14;

FIG. 16 is a cross section taken on the plane of the line XVI—XVI of FIG. 13;

FIG. 17 is a cross section on the plane of the line XVII—XVII of FIG. 13;

FIG. 18 is a cross section on the plane of line XVIII—XVIII of FIG. 13; and

FIG. 19 is a diagram of the electronic circuit elements and connections employed in the fuse.

Figure 5:
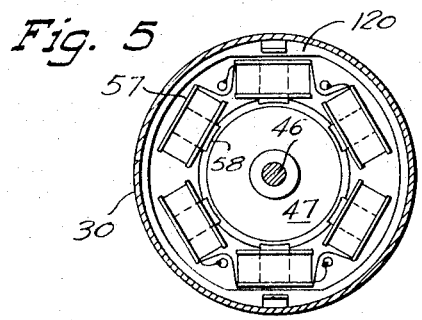
FIG. 5 is a cross section on the plane of line V—V of FIG. 3.
Figure 9:
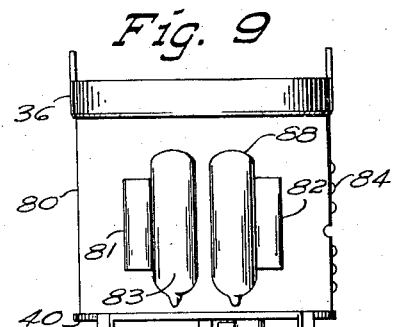
FIG. 9 is a side elevation of a sub-assembly employed for amplifying resultant of a transmitted signal and a reflected signal.
Figure 6:
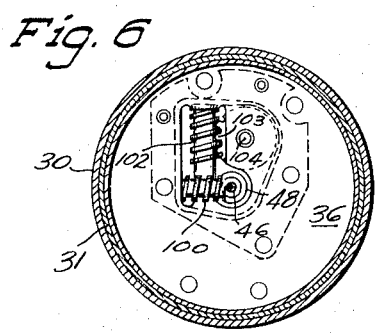
FIG. 6 is a cross section on the plane of line VI—VI of FIG. 3.
Figure 10:
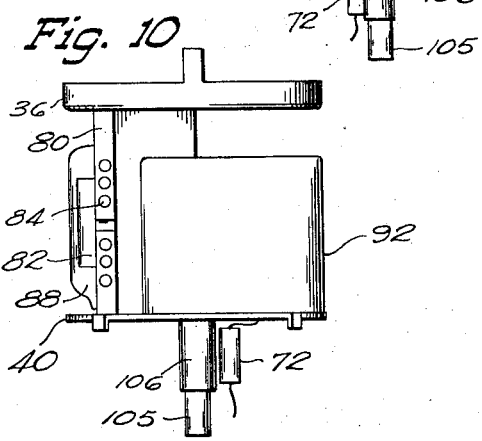
FIG. 10 is a view similar to FIG. 9 but rotated approximately 90° from the position shown in FIG. 9 and also showing a portion of the structure amplifying the resultant signal.

Generally, the present structure and the manner of its operation are as follows:

A casing is provided which is adapted for use as a nose of a projectile to be fired from a gun and which is adapted to receive a plurality of sub-assemblies. A power supply sub-assembly includes a turbine so mounted in the casing as to be driven by air as the projectile is in flight and an alternating current generator driven by the turbine to supply power for all of the various electronic and electric sub-assemblies of the structure. The output of the power sub-assembly is rectified and filtered and is then delivered to a transmitter-detector sub-assembly, an amplifier sub-assembly, and a firing circuit. In flight, the transmitter-detector excites the casing of the fuse (and the casing of the projectile) which acts as an antenna radiating a signal which is reflected by various surfaces as is well known. The reflected signal is of a frequency higher than that of the transmitted signal due to the movement of the projectile toward the reflecting surface. If the difference between the transmitted and the reflected signals is taken, such resultant or Doppler frequency is within the audio range and is detected by the transmitter-detector sub-assembly and is fed to the amplifier sub-assembly which amplifies only the Doppler frequency and attenuates all other frequencies. The amplified Doppler frequency is fed to a firing circuit sub-assembly which includes an electronic tube (a thyratron), having a grid which is suitably biased and on which bias the Doppler frequency is superimpressed. When the superimpressed signal on the grid exceeds a predetermined value, a capacitor, charged from the power sub-assembly, is discharged into a squib which fires a booster charge and thereby detonates the high explosive in the projectile. The detonating or firing circuit, in addition to electronic tube relay action, is controlled by a switch which is urged toward closed position but is mechanically latched in open position until the turbine has made a predetermined number of revolutions. A barrier is also interposed between the squib and the booster charge and prevents firing of the booster charge until the squib is brought to a predetermined position, thus additionally and mechanically preventing premature operation of the fuse.

Referring now to the drawings, the casing is formed, generally, from a cup-shaped metallic cap 30 fitted on a cylindrical metal shell 31. The cap is substantially open on one entire side (end) thereof, as indicated at 32, except for portions of the cap material extending from the periphery of the open portion toward the center thereof to form supports 33 for one of several bearings which will be particularly described. The supports 33 are bent into partial edgewise and angular (preferably 60°) relation with the center line of the structure to serve as vanes for directing the flow of air through the opening when the device is in motion. The cap 30 is also formed with apertures 34 in the peripheral wall thereof for a purpose which will appear hereinafter. The cap and shell together define a space for receiving various other sub-assemblies and portions thereof and such space is substantially divided into two portions by a spool-like structure comprising an end piece 36 with portions 37 and 38 for severally supporting bearings and other portions of the complete assembly, and further comprising a hollow cylindrical portion 39 formed as a part of a second end piece 40 completing the spool.

The space between the cap 30 and the spool end 36 contains a power supply sub-assembly comprising a turbine formed as a disk 44 with curved vanes 45 projecting from a side of the disk and fixed on a shaft 46. Air is directed into the turbine by the cap vanes 33 and the turbine disk is shaped to cause flow of air between the turbine vanes 45 and discharge therefrom at the periphery of the disk by way of the cap apertures 34. A permanent magnet 47 is fixed on the shaft 46 by a non-magnetic metal ring and is preferably composed of six equally spaced poles. The end of such shaft beyond the magnet is formed as a worm 48 for a purpose which will appear hereinafter. The shaft 46 is supported in lateral bearings which include a bushing member 51 of porous metal impregnated with a lubricant and mounted in a resilient member 52 on the support 33 formed in the cap and on the support 37 on spool end 36, respectively. The worm end of shaft 46 bears on a thrust ball 53 held jointly by a retainer 54 fixed on the spool portion 39 and by a metallic annular spring 55 fixed between such retainer and such spool portion. The magnet 47 coacts with a plurality of windings 57 mounted on a frame 58 which fits into the shell. Such frame is of laminated construction and is formed with six inwardly extending pole pieces to receive the windings and is mounted in suitable insulated relation within the cap 30. The windings 57 are connected in series but are so arranged that two different alternating current voltages are obtained therefrom.

The other end (the end opposite the cap end) of the shell 31 engages with and abuts on a portion of a transmitter-detector sub-assembly. A block, generally designated 59, of insulating and preferably a ceramic material such as steatite, of the same external dimensions as the shell and of substantial thickness, provides a mounting for the elements of the transmitter-detector sub-assembly and also insulates metallic portions of the structure and transmits forces from one metallic portion of the structure to another. The block (see FIGS. 13 to 18) is generally cylindrical with the end portions 60 cut back peripherally from a central portion 61 and formed with peripheral grooves 62 to give such block end portions a flange-like form. The grooves function as a capillary trough into which solder is drawn when the shell is joined by soldering to metallized surfaces of the block. A cavity 64 is formed in one end of the block and the block is formed with a central aperture 65, a pair of similar apertures 66 and 67, a pair of similar apertures 68 and 69, an aperture 70, apertures 71 and 72, together with a number of smaller apertures through the block, and a number of depressions and sockets in the end of the block and in the bottom of the cavity.

Figure 7:
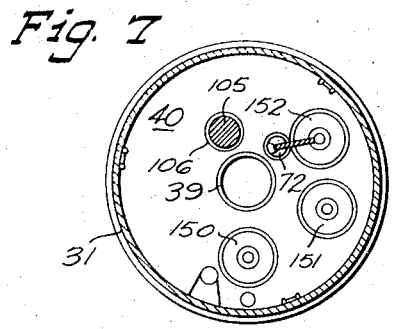
FIG. 7 is a cross section on the plane of line VII—VII of FIG. 3.
Figure 11:
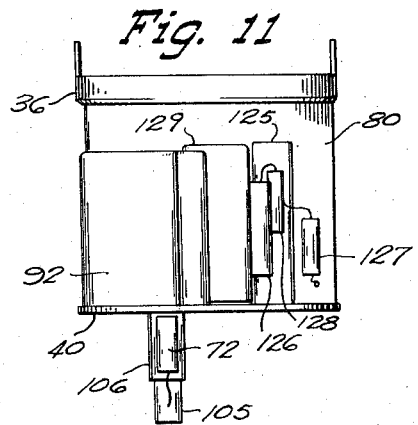
FIG. 11 is a view similar to FIG. 10 but rotated approximately 90° and illustrating a portion of the structure energized by the resultant signal after amplification thereof.

A triode tube 73 is fixed in the central aperture 65 in the block and extends therefrom into the spool cylinder 39 when the structure is finally assembled. Similar reactance coils are wound on insulating and preferably ceramic cylinders and are insertible into the apertures 66 and 67 to serve as tank and antenna coils and similar reactance coils are also wound on insulating material and inserted in the apertures 68 and 69 to serve as radio frequency chokes, the coil ends being then suitably capped and inclosed. A resistor is inserted in aperture 70 to adjust the total current flowing from windings 57' in the transformer-detector sub-assembly. A wire wound on a ceramic core and forming an inductive reactor is inserted in the aperture 72 and the ends thereof are left exposed to connect switch 143 with other portions of the circuit (see FIGS. 7 and 19). (The several above elements are designated in the circuit diagram by the numeral applied to the respective block aperture in which such elements are severally placed and the apertures 71 and 72 respectively receive mechanical parts and a coupling reactor respectively, as will appear hereinafter.) A plurality of resistors 74, 74' and 79 are formed on a surface of the block as coatings, and various connections between the various electrical elements are also made as conductive coatings 75 on the block. The peripheral surface of the block flanges 60, the grooves 62, and the ends of the block central portion 61 are also coated with conductive material to serve as a connection between the above elements and the casing of the fuse. Capacitors 76, 77 are fixed in sockets in the bottom of block cavity 64 and capacitor 78 is fixed in a socket in the top of block 59.

The space within the shell and between the spool ends 36 and 40 and outside of the spool cylinder 39 receives the amplifying sub-assembly and portions of the firing circuit and its control means. The amplifier comprises a plate 80 held between the spool ends and made of insulating material, preferably a ceramic, such as steatite, on which a large number of the electrical components of the amplifier circuit are directly formed as coatings. Such elements include capacitors and resistors which are preferably made and connected, as disclosed in Ehlers et al. application Ser. No. 556,880 and, except for two fixed capacitors 81, 82 and one electronic tube 83, comprise the entire amplifying circuit with only such wire leads as are necessary for connections of the amplifier circuit elements with the other sub-assemblies. The tube 83 is a pentode with the external leads suitably insulated from each other and bent or looped to provide resilient mountings for the tube. One edge of the insulator plate 80 is notched and the notches are filled with a conductive material as indicated at 84, to which the connections of the various circuit elements are brought. In the final assembly, the points 84 are exposed through slots in the shell side wall 31 and serve as contact points by which the electrical functioning of the finally assembled unit may be tested. The several resistors and the major portion of the connections in the amplifying unit are formed directly on the plate or fixed thereon, e.g. in the case of capacitors, as disclosed in the above application, and accordingly are not particularly shown herein. Where such elements perform unusual functions in the circuit, the elements are identified in the following discussion of the circuit diagram.

A firing circuit is provided for energization by the power supply assembly and for control by the amplifier as above indicated. The circuit includes a four-electrode tube 88 mounted for the sake of convenience, adjacent the amplifier tube 83 and in the same resilient manner. The grid of the tube 88 receives the output of the amplifier by way (see FIG. 19) of resistors 89, 90 and capacitor 91 and the plate of the tube is connected to a capacitor 92 and through the resistor 93 to winding 57'. After switch 143 is closed the capacitor 92 is charged by the generator through resistor 93 and may be discharged through tube 88, reactor 67, and a filament 98 (see FIG. 19) into a squib 99 of material, such as mercury fulminate easily detonated by heat, and through reactor 72.

Such circuit can be completed only after the release of a mechanical latch, the removal of a mechanical block or shield between the squib and a booster charge, and by the closure of a switch. The turbo-generator shaft worm 48 engages a gear 100 on a counter-shaft 101 mounted in the spool end 36 and formed with a worm 102 which engages a gear 103 on a shaft 104. Such shaft is threaded into a rod 105 which extends through a tube 106 itself extending beyond the spool end 40 and through aperture 71 in block 59. The rod is adapted to be held in the tube against lifting by a latch pin 107 and controls closure of the firing circuit and movement of the mechanical shield between the squib and the booster charge.

A metal base member 110, forming a portion of the fuse casing, is mounted on the transmitter-detector block and provides an enclosure for a block of insulating material 111 mounted on a pivot 112 and urged in one direction of rotation by a spring 113. The block receives the end of rod 105 which is shaped to engage and hold the block against the force of the spring and also receives the squib 99. Such block forms the movable member of a switch closing the firing circuit to the squib when the block is rotated. After a predetermined number of revolutions of the turbo-generator shaft 46 acting by way of the two worm and gear speed reductions (totaling 264:1) above described, the threaded connection (lost motion connection) between shaft 104 and rod 105 pulls the rod upward and releases its engagement with block 111. Spring 113 then rotates block 111 (60°) to bring the squib 99 into registry with a hole in a plate 117 held in a fixed position in the base member 110 and coacting with a cup 118 attached to such base to inclose a booster charge of explosive, such as tetryl, required to detonate the charge in the major portion of the projectile itself. Movement of the switch rotor also closes the firing circuit and thus makes it possible to explode the squib which is now in position to explode the booster charge and the projectile when a received signal of sufficient magnitude causes tube 88 to fire. It will thus be seen that the squib is both physically and electrically isolated from the booster charge until the projectile has traveled a predetermined distance. Further, the releasing of such isolating means is prevented until a safety latch has been voluntarily removed. Hence, the fuse cannot be accidentally activated by handling even if a detonating charge should remain in the capacitor 92 as a result of testing.

Resilient mounting of the bearings is necessary to maintain alignment of the generator rotor and stator and to prevent such lateral play in the rotor as would make voltage regulation difficult. Because of the fact that the bearings are of porous and lubricant impregnated metal, an oil-resistive material is used which is integrally bonded both to the bearing bushing and to the support. The resilient mounting permits considerable misalignment and absorbs vibration which causes electrical noise interfering with the performance of the fuse. Misplacement of the rotor, due to cumulative manufacturing tolerances, is avoided by the use of shims 120 and end play of the rotor in operation is prevented by the resilient mounting of the thrust ball. Because the entire rotor must operate at speeds of the order of 100,000 r.p.m., both the turbine and the generator rotors must be separately dynamically balanced and dynamically balanced as a whole to avoid excessive pressures on the lateral bearings.

Because of its highly satisfactory electrical qualities under widely varying conditions, it is desirable to use steatite as the ceramic. Such use in the transmitter-detector block requires attention to load distribution thereon to withstand the forces due to acceleration (up to 10,000 G) of the fuse parts resting on such block. Hence the weight of the cap, the generator stator and the shell are transmitted through solder joining the shell with the block and place the peripheral portion of the block in compression. The weight of the amplifier and the parts physically associated therewith, together with the weight of the generator rotor, the gears and their shafts, are separately transmitted and the load thereof is distributed by the spool end 40 on the end surface of the block where such weight is supported in shear and tension. The entire load on the block is transmitted from the annular lower end surface of the block through a lead washer 119 to the casing member 110 and distributes the load without localization of stresses in the block.

All of the transmitter-detector elements, excepting those applied as coatings directly to the block, are seated in apertures in the block and extend axially of the direction of movement of the fuse. Hence the block itself holds such elements against the action of centrifugal force thereon and the axial forces are resisted by embedding the elements in a cement which is preferably of the thermo-setting type.

The use of a single block for the transmitter-detector and a single plate for the amplifier, and having directly formed thereon a large number of the circuit elements and their connections, minimizes the number of standard elements and soldered connections required which largely reduces the assembly time and tools required. Only one tube, two capacitors, and one resistor are now required as amplifier elements separate from the plate itself. A substantially two-dimensional structure is obtained which facilitates faulty location, greatly reduces the size of the sub-assembly, and yields a much greater uniformity of product than heretofore. The arrangement of the plate axially of the fuse utilizes its highest mechanical quality of compressive resistance in the direction of the greatest forces imposed thereon. All six test points are brought out to only one edge of the plate and are accessible through one slot in the shell, and such edge is provided with a notch index for facilitating the use of test prods.

Referring now to the diagram of the electrical elements and their connections (FIG. 19), the low voltage and high voltage windings of the generator are generally designated 57 and 57', respectively. Winding 57 supplies filament power to the amplifier and relay tubes and to the transmitter-detector which is a modified Colpitts circuit using the inter-electrode capacitance of the tube 73 and the distributed capacitance of the connections, as the tuning capacitance, and requires no particular description. The high voltage winding 57' supplies a full wave rectifier of selenium cells 125 through a voltage-regulating capacitor 126, the rectifier voltage being filtered by a circuit including resistors 127, 128 and capacitor 129. Resistors 93 and 94 provide a circuit to "bleed off" any charge left in the capacitor 92 after testing of the device. Resistor 94 also functions to prevent accumulation of any charge in capacitor 92 until switch 143 is closed.

The amplifier is of the resistance-capacitance coupled type which amplifies only the frequencies in the Doppler band and attenuates all other frequencies. Such amplifier uses both regeneration and degeneration to pass the desired band. Attention need only be directed to the capacitance 133 in shunt with the tube 83, to the voltage divider 134, 135 in the screen grid circuit, and to the capacitance 91 coupling the plate of the tube with resistors 89 and 90 for delivering the amplifier out-put to the grid of tube 88 of the firing circuit and which tube acts as a relay. The amplifier includes a phase-shift network 139 and various capacitors and resistors usual in such electronic devices.

Figure 8:
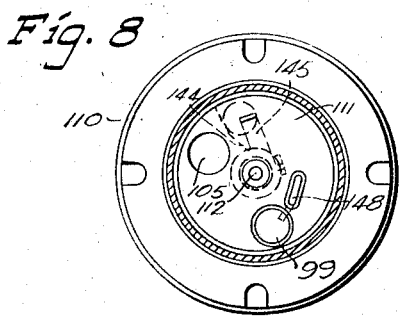
FIG. 8 is a cross section on the plane of the line VIII—VIII of FIG. 3.

The plate or tube 88 is connected with resistor 93 and with the capacitor 92, which, after closure of switch 143 and after a sufficient time for the charge to accumulate in the capacitor, may be discharged through tube 88, reactor 67, and the firing filament 98 and the reactor 72 to detonate the squib 99. The metallic portions of the fuse casing, designated 30, 31, and 110 (see FIGURES 3 and 19), and the body of the projectile are of sufficient length to serve as a half-wave antenna. The electrical connections between the transmitter-detector and the amplifier sub-assemblies are made by way of fixed capacitors 150, 151, and 152 inserted in the spool end 40 and by way of the reactor 72. The contacts of the switch 143 are indicated at 144 and 145 in FIG. 8, which also shows the relative location of the apertures for receiving the squib 99 and the rod 105. The numeral 148 designates wells in the block 111 for receiving portions of the squib structure which is not a part of the present invention and accordingly is not disclosed herein.

It will thus be seen that the present structure provides an electrical device powered by its own movement to transmit a radio frequency signal and receive a resultant of the transmitted signal and its reflection which resultant may be amplified to actuate another portion of the device. The device includes a movement energized power supply unit, a transmitter-detector unit, and means to be activated by the resultant of the transmitted and reflected signals. If the resultant signal is not sufficiently powerful to activate the means, such signal may be amplified by an amplifying unit. The means to be activated may be any device capable of actuation by the resultant signal as received or as amplified. When the means to be actuated are purely electrical there need be no mechanical supply of power from the power unit. However power may also be mechanically supplied to such means and the resultant signal may be employed only in combination with such mechanical power supply. If the structure is used as a fuse for an explosive projectile, the resultant signal is used to coact with a lost motion connection mechanically actuated by the power unit to produce interdependent electrical and mechanical means preventing premature action of the fuse. The lost motion connection then preferably controls both the completion of an electric circuit and the mechanical movement of a barrier plate separating the various explosive charges in the fuse.

Although but one embodiment of the present invention has been illustrated and designated herein, it will be apparent to those skilled in the art that various changes and modifications may be made without departing from the spirit of the invention or the scope of the appended claims.

We claim:
1. In a fuse for exploding a projectile in which flight of the projectile causes energization of an electronic device transmitting a continuous radio frequency signal and receiving a reflection of the signal, a fuse casing comprising a power supply and amplifying sub-assembly holding metallic shell, a firing circuit switch holding metal base member connectible with a projectile, and a ceramic block, said block having spaced metalized portions engageable with said shell and member and soldered thereto to structurally join said shell and base member and electrically insulate them from each other, said block also forming a mounting for the elements of a transmitter-detector oscillating circuit some of the conductive elements of which are formed on the surface of said block as coatings.

2. In a fuse as claimed in claim 1, the inclusion of amplifying circuit elements supporting spool-like structure mounted within said metallic shell and supported on the surface of said ceramic block, and a lead washer between said ceramic block and said metal base member to evenly distribute and transmit physical load on said block to said member.

References Cited

UNITED STATES PATENTS

| | | |
|---|---|---|
| 1,701,975 | 2/1929 | Gunn. |
| 2,403,567 | 7/1946 | Wales _____ 102—70.2 X |
| 2,409,205 | 10/1946 | Graumann _____ 102—81.2 |
| 2,424,193 | 7/1947 | Rost _____ 343—7 |

FOREIGN PATENTS

| | | |
|---|---|---|
| 149,723 | 5/1937 | Austria. |
| 1,089 | 1/1912 | Great Britain. |
| 91,592 | 2/1938 | Sweden. |

OTHER REFERENCES

Electronics, December 1945, pp. 99–103.

BENJAMIN A. BORCHELT, *Primary Examiner.*

MELVIN H. FRIEDMAN, EDWARD MICHAEL,
*Examiners.*

W. W. BURNS, JR., E. T. BEAN, T. H. WEBB,
*Assistant Examiners.*